United States Patent
Wade et al.

(10) Patent No.: US 10,160,142 B2
(45) Date of Patent: Dec. 25, 2018

(54) PROCESSES FOR IN-MOLD COATING USING A MULTI-CAVITY MOLD AND SUBSTRATES COATED THEREBY

(71) Applicant: Covestro LLC, Pittsburgh, PA (US)

(72) Inventors: Robert A. Wade, Oakdale, PA (US); Kurt E. Best, Wexford, PA (US); Jessee McCanna, Midland, PA (US)

(73) Assignee: Covestro LLC, Pittsburgh, PA (US)

( * ) Notice: Subject to any disclaimer, the term of this patent is extended or adjusted under 35 U.S.C. 154(b) by 89 days.

(21) Appl. No.: 15/504,768

(22) PCT Filed: Aug. 12, 2015

(86) PCT No.: PCT/US2015/044833
§ 371 (c)(1),
(2) Date: Feb. 17, 2017

(87) PCT Pub. No.: WO2016/028568
PCT Pub. Date: Feb. 25, 2016

(65) Prior Publication Data
US 2017/0274564 A1  Sep. 28, 2017

Related U.S. Application Data

(60) Provisional application No. 62/040,801, filed on Aug. 22, 2014.

(51) Int. Cl.
| | | |
|---|---|---|
| *B29C 67/00* | (2017.01) |
| *B29C 37/00* | (2006.01) |
| *C08G 18/79* | (2006.01) |
| *C08G 18/24* | (2006.01) |
| *C09D 175/06* | (2006.01) |
| *C08G 18/42* | (2006.01) |
| *C08G 18/44* | (2006.01) |
| *B29C 67/24* | (2006.01) |

(52) U.S. Cl.
CPC ........ *B29C 37/0028* (2013.01); *C08G 18/246* (2013.01); *C08G 18/4202* (2013.01); *C08G 18/4211* (2013.01); *C08G 18/44* (2013.01); *C08G 18/792* (2013.01); *C08G 18/798* (2013.01); *C09D 175/06* (2013.01); *B29C 67/246* (2013.01); *B29C 2037/0035* (2013.01); *C08G 2120/00* (2013.01)

(58) Field of Classification Search
CPC .............. B29C 37/0028; B29C 67/246; B29C 2037/0035; C08G 18/246; C08G 18/4202; C08G 18/4211; C08G 18/44; C08G 18/798; C09D 175/06
See application file for complete search history.

(56) References Cited

U.S. PATENT DOCUMENTS

| | | | |
|---|---|---|---|
| 3,124,605 A | 3/1964 | Wagner | |
| 3,358,010 A | 12/1967 | Britain | |
| 3,903,126 A | 9/1975 | Woerner et al. | |
| 3,903,127 A | 9/1975 | Wagner et al. | |
| 4,324,879 A | 4/1982 | Bock et al. | |
| 5,073,576 A * | 12/1991 | Kuyzin ............... | C08G 18/4804 521/164 |
| 5,124,427 A | 6/1992 | Potter et al. | |
| 5,208,334 A | 5/1993 | Potter et al. | |
| 5,235,018 A | 8/1993 | Potter et al. | |
| 5,387,750 A * | 2/1995 | Chiang ................. | C08G 18/10 528/52 |
| 5,914,383 A | 6/1999 | Richter et al. | |
| 6,180,043 B1 * | 1/2001 | Yonemochi ............... | B29B 7/76 264/255 |
| 6,268,057 B1 * | 7/2001 | Mizuno ................ | C08G 18/282 428/423.1 |
| 7,790,089 B2 | 9/2010 | Zöllner et al. | |
| 2006/0118999 A1 * | 6/2006 | Cooper ............... | B29C 37/0028 264/255 |
| 2011/0250457 A1 * | 10/2011 | Oota ........................ | C08F 2/44 428/413 |

FOREIGN PATENT DOCUMENTS

| | | |
|---|---|---|
| GB | 1457935 A | 12/1976 |
| WO | 2011076728 A1 | 6/2011 |

* cited by examiner

*Primary Examiner* — Michael L Leonard
(74) *Attorney, Agent, or Firm* — John E. Mrozinski, Jr.

(57) ABSTRACT

Disclosed are processes for in-mold coating of a plastic substrate. The processes include: (a) molding a plastic substrate in a first mold cavity of a mold comprising at least two cavities to form a molded plastic substrate; (b) introducing the molded plastic substrate into a second mold cavity of the mold; (c) introducing a coating composition into the second mold cavity containing the molded plastic substrate in order to coat the substrate, the coating composition comprising: (i) a polymer comprising isocyanate-reactive groups; and (ii) a polyisocyanate; (d) curing the composition in the second mold cavity; and (e) opening the mold cavity.

15 Claims, No Drawings

PROCESSES FOR IN-MOLD COATING USING A MULTI-CAVITY MOLD AND SUBSTRATES COATED THEREBY

CROSS-REFERENCE TO RELATED APPLICATIONS

This application is a national stage application under 35 U.S.C. § 371 of PCT/US2015/044833, filed Aug. 12, 2015, which claims the benefit of U.S. Provisional Application No. 62/040,801, filed Aug. 22, 2014, both of which are incorporated by reference herein.

FIELD

The present invention relates to processes for in-mold coating using a multi-cavity mold and substrates coated by such processes.

BACKGROUND INFORMATION

Two-component polyurethane forming coating compositions are widely used because of the many advantageous properties they exhibit. These coating compositions generally comprise a liquid binder component and a liquid hardener/crosslinker component. The liquid binder component may comprise an isocyanate-reactive component, such as a polyol, and the liquid crosslinker component may comprise a polyisocyanate. The addition reaction of the polyisocyanate with the isocyanate-reactive component, which can occur at ambient conditions, produces crosslinked polyurethane networks that form coating films. Polyurethane coatings are used in a wide variety, one of which is often referred to as "In-Mold" coating.

In an In-Mold coating application, a coating film is molded over the surface of a molded plastic substrate. In an In-Mold coating method that utilizes a multi-cavity metal mold, the molded plastic part is formed in one cavity of the mold and the molded plastic part is introduced into a second cavity of the mold in which the coating film is injected. Such a process can have advantages over a single cavity in-mold coating process. For example, cycle time is shorter since it is not composed of the sum of the times of the individual process steps and process parameters can be chosen independently for each cavity.

A historical problem with In-Mold coating processes including those using two-component polyurethane forming compositions, such as process that utilize a multi-cavity metal mold, is that of inadequate "demolding" after the coating has been applied, cured, and the mold opened. "Demolding" refers to the ability of a coating molded plastic substrate to release easily from the metal mold when it is opened. Poor demolding means that the coated plastic substrate adheres to the surface of the metal mold such that a significant external force is needed to remove the coated substrate from the mold. This external force often causes product quality and productivity issues, for example. Of course, other important coating properties, such as adhesion of the coating to the molded plastic substrate, and physical properties, such as scratch resistance, stain resistance, and chemical resistance, are also important.

As a result, it would be desirable to provide a process for in-mold coating utilizing a multi-cavity metal mold that exhibits excellent demolding properties, i.e., the coating plastic molded substrate releases, i.e., demolds, from the coating mold cavity via gravity alone or with a minimal external force (such as suction) when the mold is opened, so that the coated molded substrate is not deformed or otherwise damaged by its removal from the mold while providing a coated substrate that has an high quality finish exhibiting good physical properties, such as scratch resistance, stain resistance, and chemical resistance, while also adhering well to the molded plastic substrate.

The present invention was made in view of the foregoing.

SUMMARY

In some respects, the present invention is directed to a process for in-mold coating comprising: (a) molding a plastic substrate in a first mold cavity of a mold comprising at least two cavities to form a molded plastic substrate; (b) introducing the molded plastic substrate into a second mold cavity of the mold; (c) introducing a coating composition into the second mold cavity containing the molded plastic substrate in order to coat the substrate, the coating composition comprising: (i) a polymer comprising isocyanate-reactive groups; and (ii) a polyisocyanate; (d) curing the composition in the second mold cavity at a mold temperature of 62-105° C. and an external mold pressure of at least 100 kg/mm$^2$ for a period of at least 60 seconds; and (e) opening the mold cavity, wherein the coated molded substrate releases from the second mold cavity by gravity alone or with suction alone.

The present invention is also directed to, among other things, molded plastic articles coated by such a method.

It is understood that the invention disclosed and described in this specification is not limited to the embodiments summarized in this Summary. The reader will appreciate the foregoing details, as well as others, upon considering the following detailed description of various non-limiting and non-exhaustive embodiments according to this specification.

DETAILED DESCRIPTION

Various embodiments are described and illustrated herein to provide an overall understanding of the structure, function, operation, manufacture, and use of the disclosed products and processes. The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference herein to "certain embodiments", "some embodiments", "various non-limiting embodiments," or the like, means that a particular feature or characteristic may be included in an embodiment. Thus, use of such phrases, and similar phrases, herein does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments. Such modifications and variations are intended to be included within the scope of the present specification. In this manner, the various embodiments described in this specification are non-limiting and non-exhaustive.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more. As used herein, "molecular weight", when used in reference to a polymer, refers to the number average molecular weight ("$M_n$"), unless otherwise specified. As used herein, the $M_n$ of a polymer containing functional groups, such as a polyol, can be calculated from the functional group number, such as hydroxyl number, which is determined by end-group analysis, as is well known to those skilled in the art.

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure thereof. As used herein, the term "cycloaliphatic" refers to organic compounds characterized by arrangement of carbon atoms in closed ring structures. Cycloaliphatic compounds do not contain aromatic rings as part of the molecular structure thereof. Therefore, cycloaliphatic compounds are a subset of aliphatic compounds. Therefore, the term "aliphatic" encompasses aliphatic compounds and/or cycloaliphatic compounds.

As used herein, "diisocyanate" refers to a compound containing two isocyanate groups. As used herein, "polyisocyanate" refers to a compound containing two or more isocyanate groups. Hence, diisocyanates are a subset of polyisocyanates.

As earlier indicated, some embodiments of the present invention are directed to a process for in-mold coating. Such processes comprise: (a) molding a plastic substrate in a first mold cavity of a mold having at least two cavities to form a molded plastic substrate; (b) introducing the molded plastic substrate into a second mold cavity of the mold; (c) introducing a coating composition into the second mold cavity containing the molded plastic substrate in order to coat the substrate, the coating composition comprising: (i) a polymer comprising isocyanate-reactive groups; and (ii) a polyisocyanate; (d) curing the composition in the second mold cavity at a mold temperature of 62-105° C. and an external mold pressure of at least 100 kg/mm² for a period of at least 60 seconds; and (e) opening the mold cavity, wherein the coated molded substrate releases from the second mold cavity by gravity alone or with suction alone.

Embodiments of the process of the present invention are carried out in a mold which has two or more cavities of the mold, so that the two process steps of molding and coating of the substrate take place in different cavities. The surfaces of the cavities may be produced from the same or different materials, such as e.g. glass, ceramic, plastic, metals or alloys.

The molding of the substrate in the first mold cavity may be carried out, for example, by injection molding, injection compression molding, compression molding, reaction injection molding (RIM) or foaming. Thermoplastic and thermosetting plastics may be employed as substrate materials, specific examples of which include, but are not limited to, polycarbonate (PC), polyester, such as polybutyleneterephthalate (PBT) or polyethyleneterephthalate (PET), polyamide (PA), polyethylene (PE), polypropylene (PP), polystyrene (PS), poly(acrylonitrile-co-butadiene-co-styrene) (ABS), poly(acrylonitrile-co-styrene-co-acrylicester) (ASA), poly(styrene-acrylonitrile) (SAN), polyoximethylene (POM), cyclic polyolefine (COC), polyphenylenoxide (PPO), polymethylmethacrylat (PMMA), polyphenylensulfide (PPS), polyurethane (PUR), epoxy resins (EP), polyvinylchloride (PVC) and blends thereof. The substrate may be of any desired shape that the equipment can accommodate.

In certain embodiments, the molding of the substrate in the first mold cavity is carried out by the injection molding process from a thermoplastic. Suitable thermoplastics include, but are not limited to, PC, PBT, PA, PE, PP, PS, ABS, ASA, SAN, PET, POM, COC, PPO/PA or PPO/PS blends, PMMA, PPS thermoplastic polyurethane (TPU), EP, PVC and blends thereof. In some embodiments, the thermoplastic comprises a PC/ABS blend, such as Bayblend® T85 SG, from Bayer MaterialScience AG.

In some embodiments of the present invention the molding of the substrate in the first mold cavity is conducted in the presence of a compound, such as a silicone, which has isocyanate-reactive functional groups, such as, for example, thiol, amine, and/or hydroxyl groups. As a result, such a compound can form part of the substrate itself and, since it includes groups reactive with isocyanate groups in the subsequently applied coating composition. It thereby, it is currently believed, can improve adhesion of the molded substrate to the coating. If the compound is a silicone, the silicone can act as a mold release agent that fosters release of the molded substrate from the first mold cavity. Examples of such compounds, which are suitable for use in the present invention include, but are not limited to, bis(3-aminopropyl) terminated poly(dimethylsiloxane) and polycaprolactone-poly(dimethylsiloxane).

According to embodiments of the process of the present invention, after molding of the substrate, the substrate is introduced into a second cavity of the same mold. For this, the mold is opened and the substrate is transferred into a second cavity. The transfer of the substrate may be carried out by any of a variety of methods. Specific examples of suitable methods include, but are not limited to, transfer with a rotary table, turning plate, sliding cavity and index plate as well as comparable methods in which the substrate remains on the core. If the substrate remains on the core for the transfer, this has the advantage that the position is also accurately defined after the transfer. On the other hand, methods for transfer of a substrate in which the substrate is removed from one cavity, e.g. with the aid of a handling system, and laid into another cavity are also suitable.

According to embodiments of the processes of the present invention, a coating composition is introduced into the second mold cavity containing the molded plastic substrate in order to coat the substrate. The coating compositions utilized in the processes of the present invention comprise: (i) a polymer comprising isocyanate-reactive groups; and (ii) a polyisocyanate. In certain embodiments, the coating composition is a high solids compositions, which, as used herein, means that the coating composition comprises no more than 10 wt. %, such as not more than 2 wt. %, not more than 1 wt. % of volatile materials (such as organic solvents or water) based on the total weight of the composition. In certain embodiments, the composition is a 100% solids composition that has a relatively low viscosity, which, as used herein means a viscosity at 23° C. of no more than 12,000 mPa·s, when measured according to measured according to DIN EN ISO 3219/A3 determined using a rotational viscometer—Visco Tester® 550, Thermo Haake GmbH), hydroxyl content of 15.4-16.6% (measured according to DIN 53 240/2.

Suitable polymers comprising isocyanate-reactive groups include, for example, polymeric polyols, such as, for example, polyether polyols, polyester polyols, and/or polycarbonate polyols, among others.

Suitable polyether polyols, include, without limitation, those having a $M_n$ of 100 to 4,000 g/mol. Polyether polyols which are formed from recurring ethylene oxide and propylene oxide units are sometimes used, such as those having a content of from 35 to 100% of propylene oxide units, such as 50 to 100% of propylene oxide units. These can be random copolymers, gradient copolymers or alternating or block copolymers of ethylene oxide and propylene oxide. Suitable polyether polyols derived from recurring propylene oxide and/or ethylene oxide units are commercially available and include, for example, those available from, for example, Bayer MaterialScience AG (such as e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180).

In certain embodiments of the present invention, the polymeric polyol comprises a polyester polyol, such as those having a $M_n$ of 200 to 4,500 g/mol. In certain embodiments, the polyester polyol has a viscosity at 23° C. of 700 to 50,000 mPa·s and a hydroxyl number of 200 to 800 mg KOH/g. In certain embodiments, the polyester polyol comprises is based on an aromatic carboxylic polyester with an average hydroxyl functionality of greater than 2, such as 3 or more, and an average hydroxyl number of 350 to 700 mg KOH/g, such as 450 to 600 mg/KOH/g and a viscosity at 23° C. of 1000 to 30000 mPa·s. Suitable polyester polyols can be prepared, as will be appreciated, by reacting polyhydric alcohols with stoichiometric amounts of polybasic carboxylic acids, carboxylic anhydrides, lactones or polycarboxylic acid esters of $C_1$-$C_4$ alcohols.

In certain embodiments, the polyester polyol is derived from one or more of aromatic polybasic carboxylic acids or their anhydride, ester derivatives, ε-caprolactone, optionally in a mixture with one or more aliphatic or cycloaliphatic polybasic carboxylic acids or their derivatives.

Suitable compounds having a number average molecular weight from 118 to 300 g/mol and an average carboxyl functionality>2, which are suitable for use in preparing the polyester polyol, include, but are not limited adipic acid, phthalic anhydride, and isophthalic acid, or a mixture thereof is used.

For the preparation of the polyester polyols, suitable polyhydric alcohols, in some embodiments, those having a number average molecular weight of 62-400 g/mol, such as 1,2-ethanediol, 1,2 and 1,3-propanediol, the isomeric butanediols, pentanediols, hexanediols, heptanediols, and octanediols, 1,2, and 1,4-cyclohexanediol, 1,4-cyclohexanedimethanol, 4,4'-(1-methylethylidene)-biscyclohexanol, 1,2,3-propanetriol, 1,1,1-trimethylolethane, 1,2,6-hexanetriol, 1,1,1-trimethylolpropane, 2,2(bis(hydroxymethyl)-1,3-propanediol. In certain embodiments, the polyhydric alcohol comprises 1,2-propanediol, 1,3-butanediol, 1,6-hexanediol, neopentyl glycol and/or trimethylolpropane, such as 1,3-butanediol, neopentyl glycol and/or trimethylolpropane. In certain embodiments, the polyester polyol comprises a branched polyester polyol, an example of which is Desmophen® XP 2488, Bayer MaterialScience LLC.

In certain embodiments of the present invention, the polymeric polyol comprises an aliphatic polycarbonate polyol, such as a polycarbonate diol, such as those having a $M_n$ of 200 to 5000 gram/mole, such as 150 to 4,500 gram/mole, 300 to 2000 gram/mole, 300 to 2,500 gram/mole or 400 to 1000 gram/mole, and a hydroxyl functionality of 1.5 to 5, such as 1.7 to 3 or 1.9 to 2.5. Such polycarbonate polyols can, in certain embodiments, also have a viscosity at 23° C. of 2000 to 30,000 mPa·s, such as 2500 to 16000 mPa·s or 3000 to 5000 mPa·s, when measured according to DIN EN ISO 3219/A3 determined using a rotational viscometer—Visco Tester® 550, Thermo Haake GmbH, a hydroxyl content of 15.4-16.6% (measured according to DIN 53 240/2), and/or a hydroxyl number of 40 to 300 mg KOH/gram, such as 50 to 200 mg KOH/gram or 100 to 200 mg KOH/gram, when measured by end-group analysis as is well understood in the art.

Such aliphatic polycarbonate polyols can be prepared, for example, by tranesterification of monomeric dialkyl carbonates, such as dimethyl carbonate, diethyl carbonate or diphenyl carbonate with polyols having a hydroxyl functionality of at least 2.0, such as, for example, 1,4-butanediol, 1,3-butanediol, 1,5-pentandeiol, 1,6-hexanediol, 3-methyl-1,5-pentanediol, 1,12-dodecanediol, cyclohexanediomethylol, trimethylolpropane, and/or mixtures of any of these with lactones, such as ε-caprolactone. In certain embodiments of the present invention, the aliphatic polycarbonate polyol is prepared from 1,4-butanediol, 1,6-hexanediol, 3-methyl-1,5-pentanediol, or a mixture of two or more thereof with ε-caprolactone. For example, the Desmophen® C types from Bayer MaterialScience AG, such as, for example, Desmophen® C 1100 or Desmophen C 2200, can be used as polycarbonate diols.

In certain embodiments of the present invention, the polymer comprising isocyanate-reactive groups comprises (i) a polyester polyol, such as a branched polyester polyol, and (ii) a polycarbonate polyol, such as a polycarbonate diol, such as a polycarbonate polyester diol, such as those based on 1,6-hexanediol and ε-caprolactone. In certain embodiments, the weight ratio of (i) and (ii) in the coating compositions used in the processes of the present invention is in the range of 1:10 to 10:1, such as 1:5 to 5:1, 1:4 to 4:1, 1:3 to 3:1, 1:2 to 2:1, or, in some cases, it is 1:1. In certain embodiments, the polymer comprising isocyanate-reactive groups (or mixture of two or more such polymers as described above) is selected so as to have a relatively low viscosity at 23° C. (measured according to DIN EN ISO 3219/A.3), such as no more than 10,000 mPa·s, or, in some cases, no more than 9,000 or no more than 8,000 mPa·s.

As indicated, the coating compositions used in the process of the present invention further comprise a polyisocyanate. Suitable polyisocyanates include aromatic, araliphatic, aliphatic or cycloaliphatic di- and/or polyisocyanates and mixtures thereof. In certain embodiments, the polyisocyanate comprises a diisocyanates of the formula R(NCO)$_2$, wherein R represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable diisocyanates include xylylene diisocyanate, tetramethylene diisocyanate, 1,4-diisocyantobutane, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexan-e (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, α,α,α',α'-tetramethyl-m- or -p-xylylene diisocyanate, and triphenylmethane 4,4',4"-triisocyanate as well as mixtures thereof. Also suitable are monomeric triisocyanates such as 4-isocyanatomethyl-1,8-octamethylene diisocyanate.

Polyisocyanate adducts containing isocyanurate, iminooxadiazine dione, urethane, biuret, allophanate, uretidione and/or carbodiimide groups are also suitable for use in the coating compositions used in the processes of the present invention. Such polyisocyanates may have isocyanate functionalities of 3 or more and can be prepared, for example, by the trimerization or oligomerization of diisocyanates or by the reaction of diisocyanates with polyfunctional compounds containing hydroxyl or amine groups. In one particular embodiment, the polyisocyanate is the isocyanurate of hexamethylene diisocyanate, which may be prepared in accordance with U.S. Pat. No. 4,324,879 at col. 3, line 5 to col. 6, line 47, the cited portion of which being incorporated herein by reference.

In certain embodiments of the present invention, the coating composition comprises a low viscosity polyisocyanate having a viscosity at 23° C. and at 100% solids of less than 2000 mPa·s, such as less than 1500 mPa·s or, in some cases, 800 to 1400 mPa·s, when measured according to DIN EN ISO 3219/A3 determined using a rotational viscometer—Visco Tester® 550, Thermo Haake GmbH; an isocyanate group content of 8.0 to 27.0 wt. %, such as 14.0-24.0 wt. % or 22.5-23.5% (according to DIN EN ISO 11909); an NCO calculated functionality of 2.0 to 6.0, such as 2.3 to 5.0 or 2.8 to 3.2; and a content of monomeric diisocyanate of less than 1 wt. %, such as less than 0.5 wt. %.

Examples of these polyisocyanates include isocyanurate group-containing polyisocyanates prepared by trimerizing hexamethylene diisocyanate until the reaction mixture has an NCO content of 42 to 45, such as 42.5 to 44.5 wt. %, subsequently terminating the reaction and removing unreacted hexamethylene diisocyanate by distillation to a residual content of less than 0.5 wt. %; uretdione group-containing polyisocyanates which may present in admixture with isocyanurate group-containing polyisocyanates; biuret group-containing polyisocyanates which may be prepared according to the processes disclosed in U.S. Pat. Nos. 3,124,605; 3,358,010; 3,903,126; and 3,903,127; isocyanurate and allophanate group-containing polyisocyanates which may be prepared in accordance with the processes set forth in U.S. Pat. Nos. 5,124,427, 5,208,334 and 5,235,018; and iminooxadiazine dione and optionally isocyanurate group-containing polyisocyanates which may be prepared in the presence of special fluorine-containing catalysts as described in DE-A 19611849.

Cyclic and/or linear polyisocyanate molecules may usefully be employed. For improved weathering and diminished yellowing the polyisocyanate(s) of the isocyanate component is typically aliphatic.

In certain embodiments of the present invention, the polyisocyanate comprises, or, in some cases, consists essentially of, or consist of, a polyisocyanate containing biuret groups, such as the biuret adduct of hexamethylene diisocyanate (HDI) available from Bayer MaterialScience LLC under the trade designation Desmodur® N-100, a polyisocyanate containing isocyanurate groups, such as that available from Bayer MaterialScience LLC under trade designation Desmodur® N-3300, and/or a polyisocyanate containing urethane groups, uretdione groups, carbodiimide groups, allophonate groups, and the like. These derivatives are preferred as they are polymeric, exhibit very low vapor pressures and are substantially free of isocyanate monomer.

The pre-reaction of the polyisocyanate with hydroxy group-containing material results in the modified polyisocyanate having a higher molecular weight and lower isocyanate content than the polyisocyanate alone. This will often lead to a higher viscosity in the modified polyisocyanate. It is often desirable that the modified polyisocyanate is low in viscosity, such as those in which the Brookfield viscosity is less than about 10,000 cps, such as less than 5,000 cps, or, in some cases, less than 4,000 cps at temperatures ranging from 25° C. to 70° C. Exemplary such polyisocyanates include those commercially available from Bayer MaterialScience LLC under the tradename Desmodur® N-3600, which has a viscosity of 800-1400 mPa·s at 25° C.

In certain embodiments, in forming the coating composition used in the process of the present invention, the polymer(s) comprising isocyanate-reactive groups, such as the polyol(s) mentioned earlier and the polyisocyanate(s) are combined in relative amount such that the coating composition has a ratio of isocyanate groups to isocyanate-reactive groups of 0.8 to 3.0:1, such as 0.8 to 2.0:1, or, in some cases, 1:1 to 1.8:1 or 1:1 to 1.5:1. In some embodiments, this ratio is greater than 1:2:1, such as at least 1:3:1 and/or up to 1:4:1. Indeed, it is currently believed that such "over-indexing" of isocyanate groups to isocyanate-reactive groups can be a significant contributor to the ability of a coated molded substrate to de-mold from the second mold cavity via gravity alone or with suction alone after the coating composition has cured, since, under the elevated temperature and elevated pressure cure conditions used in the processes of the present invention all, or substantially all, of the isocyanate-reactive groups, such as hydroxyl groups, are thought to either cure by exposure to moisture or form allophonate groups, thereby providing a more complete cure of the coating composition.

In certain embodiments, the coating compositions used in the process of the present invention further comprise a catalyst for the reaction between the isocyanate-reactive group, such as the hydroxyl group, and the isocyanate group. Suitable such catalysts include metallic and nonmetallic catalysts, specific examples of which include, but are not limited to, amine catalysts, such as 1,8-diazabicyclo[5.4.0]undec-7-ene (DBU), 1,4-diazabicyclo[2.2.2]octane (DABCO) or triethanolamine, and Lewis acid compounds, such as dibutyltin dilaurate, lead octoate, tin octoate, titanium and zirconium complexes, cadmium compounds, bismuth compounds, such as bismuth neodecanoate and iron compounds. In certain embodiments, the catalyst is present in the coating composition in an amount of no more than 1.0 wt. %, based on the total solids contents of the composition.

In certain embodiments, the coating compositions of the present invention comprise a silicone, which, it is currently believed, can act as an internal mold release agent in the coating composition, thereby facilitating the release of the cured coating from the second mold cavity by force of gravity alone or with suction alone when the mold is opened.

In fact, it has been surprisingly discovered that polyether-modified silicone compounds are particularly suitable for use in the processes of the present invention, as they tend to increase the likelihood that the coated molded substrate will release from the second mold cavity by the force of gravity alone or with suction alone when the mold is opened.

Examples of polyether-modified silicones suitable for use in the present invention include compounds in which a polyether chain is included at ends and/or side chains of a polysiloxane, and also includes a co-modified silicon compound in which a different organic group is also included into polysiloxane. It is also possible that the polyether-modified silicone include a (meth)acryloyl group in a molecule.

Examples of polyether-modified silicone compounds, which are suitable for use in the present invention include, but are not limited to, BYK® silicones, such as, but not limited to BYK®-377, which is a solvent-free polyether-modified, hydroxyl-functional polydimethylsiloxane, from BYK USA Inc.

Examples of other internal mold release agents, which are suitable for use in the present invention, include polyester-modified silicone compounds in which a polyester chain is included at ends and/or side chains of a polysiloxane, and also includes a co-modified silicon compound in which a different organic group is also included together into polysiloxane. It is also possible that the polyester modified silicone include a (meth)acryloyl group in a molecule.

Examples of polyester-modified silicone compounds, which are suitable for use in the present invention, include, but are not limited to, BYK® silicones, such as, but not limited to BYK-370, which is a solution of a polyester-modified, hydroxyl-functional polydimethylsiloxane, 75% solids content in xylene, alkylbenzes, cyclohexanone, and monophenyl glycol, from BYK USA Inc.

In certain embodiments of the coating composition used in the processes of the present invention, the internal mold release agent, such as the foregoing silicones, are present in the composition in an amount of 0.1 to 5% by weight, such as 0.1 to 1.0 percent by weight, based on the total weight of the coating composition. In certain embodiments of the present invention, the internal mold release agent is present in the composition in an amount sufficient to provide a cured coating with a surface tension of no more than 30 dynes/cm, such as no more than 25 dynes/cm when measured using a Ramé-Hart goniometer in which total solid surface energies, including the polar and dispersive components are calculated using the advancing angles according to the Owens Wendt procedure and in which samples are stacked together without surface protection and the surfaces are lightly brushed to remove dust prior to analysis.

The coating compositions used in the processes of the present invention may comprise any customary auxiliaries and additives of paint technology, such as defoamers, thickeners, pigments, dispersing assistants, catalysts, anti-skinning agents, anti-settling agents or emulsifiers, for example.

As previously indicated, in the processes of the present invention, the coating composition is introduced into the second mold cavity containing the molded plastic substrate in order to coat the substrate and the composition is cured in the second mold cavity at cure conditions of an elevated pressure and temperature. If two-component coating compositions are employed, particularly those with a short pot life due to the presence of a sufficient amount of cure catalyst, these components may be mixed thoroughly either in an injection nozzle, such as a high pressure countercurrent mixing head, or in the feed line by a static mixer or active mixing with the aid of a dynamic mixer, depending on the pot life and installation technology. If the pot life is long due, for example, to the absence of any cure catalyst or a sufficiently low amount of cure catalyst, mixing of the two components may also be carried out outside the installation and the mixture can be processed like a one-component system. In this case, for example, the processing time may be prolonged by cooling the components before injection, and a short reaction time may be achieved by increasing the mold temperature in the second cavity.

In embodiments of the present invention, the coating step is carried out under pressure. This means that the application of the coating composition to the molded plastic substrate is carried out under pressure. In certain embodiments, the coating is applied by injecting the coating composition under pressure into the gap between the surface of the substrate and the inner wall of the cavity. The pressure is high enough for the cavity, which is pressurized due to an external pressure device, such as clamps (as described in more detail below), to be filled before the end of the pot life of the coating composition is reached. At the same time, the pressure prevents the formation of bubbles at the flow front of the coating composition.

Curing of the coating composition is also carried out under pressure. In the context of the present invention, curing of the coating composition means that the coating has cured to an extent sufficient so that upon opening of the mold, the coated molded substrate releases, i.e., demolds, from the mold by the force of gravity alone or with suction alone when the mold is opened. At the end of the curing time, the pressure in the cavity may have fallen to ambient pressure.

In fact, it is currently believed, surprisingly, that several factors contribute to the ability to conduct an in-mold coating process in which upon opening the second mold cavity, the coated mold plastic substrate releases, i.e., demolds, from the internal surface of the second mold by the force of gravity alone or, at most, a suction force alone when the mold is opened, and without any additional force or effort being required to remove the coated molded substrate from the cavity. In particular, it is currently believed that a combination of mold temperature, external mold pressure, cure time, the composition of the coating itself (including the presence of an internal mold release agent as described above and the ratio of isocyanate groups to isocyanate-reactive groups described earlier), and the presence of the external mold release agent described below each can be a significant contributor to the ability of a coated molded substrate to de-mold from the second mold cavity via gravity alone or with suction alone after the coating composition has cured and the mold is opened.

More particularly, and without being bound by any theory, it is currently believed that in the processes of the present invention, the coating composition (including the presence of an internal mold release agent as described above and the ratio of isocyanate groups to isocyanate-reactive groups described earlier) and the selected combination of cure time, mold temperature and external mold pressure used are selected so that urea groups of the polyurethanes chains in the cured coating are crosslinked with one another in the coating, thereby increasing the crosslink density of the polyurethane polymeric network. It is currently believed that this crosslinking of the polyurethane chains can be measured by analyzing the content of free urea groups in the cured coating when the mold is opened.

As indicated earlier, in certain embodiments of the processes of the present invention, the coating composition is injected into the second mold cavity. The second mold cavity may be of any desired design, so that the coating layer is, if desired, the same thickness over the entire surface of the substrate. In other cases, if desired, the cavity may be shaped such that the coating layer is of a different thickness in various regions of the substrate. In some cases, the second mold cavity may have a textured surface or may have a desired design or logo that is sought to be included in the coating. The desired coating layer thickness may be achieved at any point of the substrate in this manner. In certain embodiments of the present invention, an external release agent is present on the surface of one or both of the cavities. In particular, it has been discovered that a coating comprising electroless nickel and polytetrafluoroethylene (PTFE) is particularly suitable as an external release agent in the process of the present invention. Such a coating is commercially available under the tradename Poly-Ond® from Poly-Plating, Inc. In certain embodiments of the present invention, the mold cavity is designed such that the dry film thickness of the coating layer that is produced is 0.02 to 10 millimeters such as 0.02 to 0.3 millimeters.

Injection of the coating composition into the second mold cavity can be accomplished via injection of the composition into the cavity via one or more nozzles such that the gap between the surface of the molded substrate and mold inner wall is filled completely with the coating composition. For an optimum injection of the coating composition, the number and position of the injection points can be chosen appropriately in a manner known to the person skilled in the art. In certain embodiments, the second mold cavity is designed so as to provide a controlled displacement of the air present in the cavity and its removal via a parting line or venting channels during the injection. Known calculation programs may be used for this. The sprue design for injection of the coating composition may be e.g. according to the sprue variants known from the prior art for the production of RIM moldings.

In certain embodiments, the coating is carried out by the RIM process with a single cavity. This has the advantage that the two components of the two-component of the coating composition are combined only immediately before injection into the cavity. In certain embodiments, this is accomplished by feeding a component comprising an isocyanate-reactive resin (as described above) and a component comprising a polyisocyanate (as described above) from a RIM installation into an impingement mixing head where the components are mixed before injection into the second mold cavity. In certain embodiments of the present invention, the mixture is injected into the second mold cavity at a flow rate of 15-20 grams/second, a line pressure of 2500 to 2800 psi (176 to 197 kg/cm$^2$, 172-193 bar) and a temperature of 120-125° F. (49-52° C.). Typically, to achieve such pressures, each of the components is fed to the impingement mixing head through a small diameter an orifice having a diameter of, for example, such as 1.0 µm or less.

Once the coating composition is in the second mold cavity, it is exposed to cure conditions of elevated temperature and external mold pressure.

It has been discovered that suitable mold temperatures for used in the present invention range, for example, from 62 to 105° C., such as 75 to 105° C. As used herein, "external mold pressure" means the externally applied pressure applied against the opposing faces of the mold (in which the second cavity is disposed) when the opposing faces of the mold are forced together. The source of such pressure can be clamps, rams, or another device. It is currently believed, surprisingly, that this external pressure is a critical feature (in interaction with the other factors described herein, such as the second cavity mold temperature, the cure time and the coating composition itself) of the present invention. In certain embodiments, the external mold pressure is at least 100 kg/mm$^2$ (9807 bar), such as at least 110 (10787 bar), or at least 120 kg/mm$^2$ (11768 bar). In certain of these embodiments, the external mold pressure is no more than 200 kg/mm$^2$ (19613 bar), such as no more than 180 (17652 bar) or no more than 160 kg/mm$^2$ (15691 bar). The external mold pressure, in certain embodiments, is maintained relatively constant through the coating cure process. In certain embodiments, the reaction, i.e., cure, time is at least 60 seconds, such as at least 70 seconds. In some of these embodiments, the cure time is no more than 120 seconds.

As will be appreciated, the process according to the invention may also be carried out in a mold having more than the two cavities. Thus, for example, further coating layers with optionally specific properties may be applied by applying each coating layer in its own cavity. It is furthermore possible to produce several molded plastic substrates in parallel in one cavity each and then to coat these successively in one cavity or in parallel in one cavity each.

The process according to the invention offers a critical advantage compared with the prior art. In particular, it has been observed that it is possible by proper selection of the coating composition and cure conditions (mold temperature, external mold pressure, and cure time) to provide a sufficiently cured coating on a molded plastic part such that when the second mold cavity is opened, the molded plastic part releases, i.e., demolds, from the second mold by the force of gravity alone or with suction alone. In other words, there is no need to pull the coated molded substrate from the internal surface of the second mold cavity using an external force sufficient to risk the possibility of deformation or other damage of the molded substrate.

The injection molding device of the mold according to the invention serves for the production of the substrate from a thermoplastic or thermosetting by means of injection molding in a first cavity of the mold. Suitable injection molding devices are known to the person skilled in the art. They include a standard injection molding machine construction comprising a plasticating unit for processing of the substrate and a closing unit, which is responsible for the travelling, opening and closing movement of the mold, temperature control apparatuses and optionally drying apparatuses for the substrate.

The coating injection device, which is connected to a second cavity in the mold according to the invention, serves for coating of the substrate. Suitable coating injection devices can include one or more reservoir containers for the individual components, stirrers, feed pumps, temperature control devices for establishing the temperature, feed lines and optionally a mixing device for mixing more than one coating component, e.g. a mixing head for high pressure counter-jet mixing.

The coated molded plastic substrate produced by the processes of the present invention are suitable, for example, as automobile interior components, such as e.g. pillar lining, trim, glove compartment covers, coverings, light shades, instrument panels, components of the air delivery system, and industrially produced components of plastic, such as e.g. housings of electrical equipment, mobile telephones and household articles.

As will be appreciated by the foregoing description, embodiments of the present invention are directed to processes for in-mold coating comprising: (a) molding a plastic substrate in a first mold cavity of a mold comprising at least two cavities to form a molded plastic substrate; (b) introducing the molded plastic substrate into a second mold cavity of the mold; (c) introducing a coating composition into the second mold cavity containing the molded plastic substrate in order to coat the substrate, the coating composition comprising: (i) a polymer comprising isocyanate-reactive groups; and (ii) a polyisocyanate; (d) curing the composition in the second mold cavity at cure conditions of a mold temperature of 62-105° C. and an external mold pressure of at least 100 kg/mm$^2$ for a period of at least 60 seconds; and (e) opening the mold cavity, wherein the coated molded substrate release from the second mold cavity by gravity alone or with suction alone.

Embodiments of the present invention are directed to a process of the previous paragraph, wherein the surfaces of the mold cavities may be produced from the same or different materials, such as e.g. glass, ceramic, plastic, metals or alloys.

Embodiments of the present invention are directed to a process of either of the previous two paragraphs, wherein the molding of the substrate in the first mold cavity is carried out by injection molding, injection compression molding, compression molding, reaction injection molding (RIM) or foaming.

Embodiments of the present invention are also directed to a process of any of the previous three paragraphs, wherein the substrate comprises a thermoplastic and/or thermosetting plastic, such as polycarbonate, polyester, such as polybutyleneterephthalate or polyethyleneterephthalate, polyamide, polyethylene, polypropylene, polystyrene, poly(acrylonitrile-co-butadiene-co-styrene), poly(acrylonitrile-co-styrene-co-acrylicester), poly(styrene-acrylonitrile), polyoximethylene, cyclic polyolefine, polyphenylenoxide, polymethylmethacrylate, polyphenylensulfide, polyurethane, epoxy resin, polyvinylchloride or blend thereof, such as PPO/PA, PPO/PS, or PC/ABS blend.

In some embodiments, the present invention is directed to a process of any of the previous four paragraphs, wherein the molding of the substrate in the first mold cavity is conducted in the presence of a compound, such as a silicone, which has isocyanate-reactive functional groups, such as, for example, thiol, amine, and/or hydroxyl groups, such as bis(3-aminopropyl) terminated poly(dimethylsiloxane) and/or polycaprolactone-poly(dimethylsiloxane).

Embodiments of the present invention are directed to a process of any of the previous five paragraphs, wherein the coating composition comprises no more than 10 wt. %, such as not more than 2 wt. %, not more than 1 wt. % of volatile materials (such as organic solvents or water) based on the total weight of the composition or is a 100% solids composition.

In certain embodiments, the present invention is directed to a process of any of the previous six paragraphs, wherein the coating composition has a viscosity at 23° C. of no more than 12,000 mPa·s, when measured according to measured according to DIN EN ISO 3219/A3 determined using a rotational viscometer—Visco Tester® 550, Thermo Haake GmbH), hydroxyl content of 15.4-16.6% (measured according to DIN 53 240/2.

Embodiments of the present invention are directed to a process of any of the previous seven paragraphs, wherein the polymer comprising isocyanate-reactive groups comprises: (i) a polyester polyol, such as an aromatic branched polyester polyol, such as those having a $M_n$ of 200 to 4,500 g/mol, a viscosity at 23° C. of 700 to 50,000 mPa·s, a hydroxyl number of 200 to 800 mg KOH/g, an average hydroxyl functionality of greater than 2, such as 3 or more, an average hydroxyl number of 350 to 700 mg KOH/g, such as 450 to 600 mg/KOH/g, and/or a viscosity at 23° C. of 1000 to 30000 mPa·s; and (ii) an aliphatic polycarbonate polyol, such as a polycarbonate diol, such as those having a $M_n$ of 200 to 5000 gram/mole, such as 150 to 4,500 gram/mole, 300 to 2000 gram/mole, 300 to 2,500 gram/mole or 400 to 1000 gram/mole, a hydroxyl functionality of 1.5 to 5, such as 1.7 to 3 or 1/9 to 2.5, a viscosity at 23° C. of 2000 to 30,000 mPa·s, such as 2500 to 16000 mPa·s or 3000 to 5000 mPa·s, when measured according to DIN EN ISO 3219/A3 determined using a rotational viscometer—Visco Tester® 550, Thermo Haake GmbH, a hydroxyl content of 15.4-16.6% (measured according to DIN 53 240/2), and/or a hydroxyl number of 40 to 300 mg KOH/gram, such as 50 to 200 mg KOH/gram or 100 to 200 mg KOH/gram, when measured by end-group analysis as is well understood in the art, wherein, in some embodiments, the weight ratio of (i) and (ii) in the coating compositions used in the processes of the present invention is in the range of 1:10 to 10:1, such as 1:5 to 5:1, 1:4 to 4:1, 1:3 to 3:1, 1:2 to 2:1, or, in some cases, it is 1:1.

In certain embodiments, the present invention is directed to a process of any of the previous eight paragraphs, wherein the polyisocyanate comprises a polyisocyanate adduct containing isocyanurate, iminooxadiazine dione, urethane, biuret, allophanate, uretidione and/or carbodiimide groups, such as the isocyanurate of hexamethylene diisocyanate, including low viscosity polyisocyanates having a viscosity at 23° C. and at 100% solids of less than 2000 mPa·s, such as less than 1500 mPa·s or, in some cases, 800 to 1400 mPa·s, when measured according to DIN EN ISO 3219/A3 determined using a rotational viscometer—Visco Tester® 550, Thermo Haake GmbH; an isocyanate group content of 8.0 to 27.0 wt. %, such as 14.0-24.0 wt. % or 22.5-23.5% (according to DIN EN ISO 11909); an NCO calculated functionality of 2.0 to 6.0, such as 2.3 to 5.0 or 2.8 to 3.2; and/or a content of monomeric diisocyanate of less than 1 wt. %, such as less than 0.5 wt. %.

Embodiments of the present invention are also directed to a process of any of the previous nine paragraphs, wherein the polymer(s) comprising isocyanate-reactive groups and the polyisocyanate(s) are combined in relative amounts such that the coating composition has a ratio of isocyanate groups to isocyanate-reactive groups of 0.8 to 3.0:1, such as 0.8 to 2.0:1, 1:1 to 1.8:1, 1:1 to 1.5:1, greater than 1:2:1, at least 1:3:1 and/or up to 1:4:1.

In certain embodiments, the present invention is directed to a process of any of the previous ten paragraphs, wherein the composition further comprises a silicone, such as a polyether-modified silicone, which may be present in the composition in an amount of 0.1 to 5% by weight, such as 0.1 to 1.0 percent by weight, based on the total weight of the coating composition and may be present in the composition in an amount sufficient to provide a cured coating with a surface tension of no more than 30 dynes/cm, such as no more than 25 dynes/cm when measured using a Ramé-Hart goniometer in which total solid surface energies, including the polar and dispersive components are calculated using the advancing angles according to the Owens Wendt procedure and in which samples are stacked together without surface protection and the surfaces are lightly brushed to remove dust prior to analysis.

Embodiments of the present invention are also directed to a process of any of the previous eleven paragraphs, wherein an external release agent is present on the surface of the second mold cavity, wherein the external release agent comprises a coating comprising electroless nickel and polytetrafluoroethylene (PTFE).

In certain embodiments, the present invention is directed to a process of any of the previous twelve paragraphs, wherein the coating is cured at a mold temperature of 75 to 105° C., and/or an external mold pressure of at least 110 (10787 bar), or at least 120 kg/mm$^2$ (11768 bar) and/or no more than 200 kg/mm$^2$ (19613 bar), such as no more than 180 (17652 bar) or no more than 160 kg/mm$^2$ (15691 bar) and/or for a period of at least at least 70 seconds.

EXAMPLES

Example 1

Coating compositions were prepared using the ingredients and amounts listed in Table 1. In each case, Component I was prepared by blending the Desmophen® polyols in a high speed disperser at about 2000 rpm. The remaining ingredients of Component I were separately weighed and added directly to the polyols during the mixing. After about 15 minutes of mixing, Component I was packaged.

TABLE 1

| | Example 1A | | Example 1B | |
|---|---|---|---|---|
| Ingredient | Percent by Weight | Percent by Volume | Percent by Weight | Percent by Volume |
| Component 1 | | | | |
| Desmophen ® XP 2488[1] | 23.90 | 24.25 | 23.98 | 24.28 |
| Desmophen ® C 1100[2] | 23.90 | 24.62 | 23.98 | 24.73 |
| Dabco ® T-12[3] | 0.53 | 0.63 | 0.53 | 0.59 |
| BYK ®-377[4] | 0.32 | 0.38 | — | — |
| FC 983[5] | 0.21 | 0.25 | 0.21 | 0.24 |
| Component 2 | | | | |
| Desmodur ® N-3600[6] | 51.13 | 50.00 | 51.29 | 50.16 |
| Calculated Formulation Data | | | | |
| Weight % Solids | | 100% | | 100% |
| Volume % Solids | | 100% | | 100% |
| NCO:OH | | 1.02:1 | | 1.02:1 |
| Mix Ratio (volume) | | 1.00:1 | | 0.99:1 |
| VOC | | 0 | | 0 |

[1]a branched isophthalic acid containing polyester polyol (form supplied is a solvent-free light liquid), OH number of 528, OH equivalent weight of about 106, viscosity at 23° C. of 12,000-14,500 mPa · s (measured according to DIN EN ISO 3219/A3 determined using a rotational viscometer - Visco Tester ® 550, Thermo Haake GmbH), hydroxyl content of 15.4-16.6% (measured according to DIN 53 240/2), acid number of ≤4.0 mg KOH/gram (measured according to DIN EN ISO 2114), Bayer MaterialScience LLC
[2]a linear aliphatic polycarbonate polyester polyol (form supplied is solvent-free) based on 1,6-hexane diol and ε-caprolactone with a $M_n$ of about 1,000 (OH equivalent weight of about 500), a hydroxyl content of 3.0 to 3.6% (measured according to DIN 53 240/2), a hydroxyl number of about 110 mg KOH/g and a viscosity at 23° C. of 1,900-4,500 mPa · s (measured according to DIN EN ISO 3219/A3 determined using a rotational viscometer - Visco Tester ® 550, Thermo Haake GmbH measured according to DIN EN ISO 3219/A.3), Bayer MaterialScience LLC.
[3]dibutyltin dilaurate (DBTDL) catalyst, Air Products and Chemicals, Inc.
[4]polyether modified polydimethylsiloxane, BYK USA Inc.
[5]defoamer, Enterprise Specialty Products Inc.
[6]solvent-free, low viscosity hydrophobic polyisocyanate containing isocyanurate groups and based on hexamethylene diisocyanate, average NCO equivalent weight of 183, NCO content of 22.5-23.5% (according to DIN EN ISO 11909), and a viscosity at 25° C. of 800 to 1400 mPa · s (according to DIN EN ISO 3219/A3 determined using a rotational viscometer - Visco Tester ® 550, Thermo Haake GmbH), and a NCO functionality of 3.1 (calculated from NCO content and number average molecular weight, determined by GPC measurement), Bayer MaterialScience AG

Example 2

In-mold coated plastic substrates having a projected area of 195.5 cm$^2$ were produced on an injection molding machine in an injection mold having two cavities (a first mold cavity for molding a plastic substrate and a second mold cavity for in-mold coating the molded plastic substrate, which was linked to an RIM installation). In each case, the molded plastic substrate was in the form of a rectangular plaque, the wall thickness of the substrate molding was about 3 millimeters and the coating dry film thickness was 0.1 to 1 millimeter.

In each case, the molded plastic substrate was produced in the first step. For this, granules of a PC+ABS blend (Bayblend® T85 SG from Bayer MaterialScience AG) were melted in an injection molding cylinder. After the melting operation, the melted thermoplastic was injected into the first mold cavity of the closed mold at a mold set point temperature of 165-200° F. (74-93° C.) and an external clamp pressure of 200 ton/in$^2$ (315 kg/mm$^2$, 30888 bar). After a holding and cooling time of about 45 seconds had elapsed, the mold was opened. During this, the substrate produced was held on the ejector side of the injection mold and moved complete with the mold core, into the second mold cavity by a slide. In some examples, as noted in Table 2, the second mold cavity was coated beforehand with a coating of electroless nickel and polytetrafluoroethylene (Poly-Ond®, from Poly-Plating, Inc.). Once the substrate was in position in the second mold cavity, the injection mold was closed again, an external clamp pressure (amounts set forth in Table 2) was applied and a solvent-free coating composition (as noted in Table 2) was injected into the second mold cavity. Component I and Component II of the coating composition were fed from the RIM installation into an impingement mixing head and mixed there before the injection at a flow rate of 15-20 grams/second, a line pressure of 2500 to 2800 psi (176 to 197 kg/cm$^2$, 172-193 bar) and a temperature of 120-125° F. (49-52° C.). Component I was fed from the RIM installation through an orifice having a diameter of 0.00032 inch (8.1 μm) and Component II was fed from the RIM installation through an orifice having a diameter of 0.00028 inch (7.1 μm). After a reaction time in the second mold cavity of 75 seconds had elapsed, the mold was opened and a determination was made as to whether the coated molded substrate released, i.e., demolded, from the second mold cavity by force of gravity alone when the mold was opened. In these examples, as shown in Table 2, the external mold clamp pressure and the mold surface temperature of the second mold cavity on the coating side were varied. Results are set forth in Table 2.

TABLE 2

| Example | Mold Temperature | External Mold Clamp Pressure | Poly-Ond ® Coating on Coating Mold | Coating Example | Result[7] |
|---|---|---|---|---|---|
| 2A | 104.4° C. | 157.5 kg/mm$^2$ (15445 bar) | Yes | 1A | Pass |
| 2B | 104.4° C. | 110.2 kg/mm2 (10807 bar) | Yes | 1A | Pass |
| 2C | 104.4° C. | 157.5 kg/mm2 (15445 bar) | Yes | 1B | Pass |
| 2D | 104.4° C. | 110.2 kg/mm2 (10807 bar) | Yes | 1B | Pass |
| 2E | 76.7° C. | 157.5 kg/mm2 (15445 bar) | Yes | 1A | Pass |
| 2F | 76.7° C. | 110.2 kg/mm2 (10807 bar) | Yes | 1A | Fail |
| 2G | 76.7° C. | 157.5 kg/mm2 (15445 bar) | No | 1B | Fail |
| 2H | 76.7° C. | 110.2 kg/mm2 (10807 bar) | No | 1B | Fail |
| 2I | 76.7° C. | 157.5 kg/mm2 (15445 bar) | No | 1A | Pass |
| 2J | 76.7° C. | 110.2 kg/mm2 (10807 bar) | No | 1A | Fail |
| 2K | 104.4° C. | 157.5 kg/mm2 (15445 bar) | No | 1B | Fail |
| 2L | 104.4° C. | 110.2 kg/mm2 (10807 bar) | No | 1B | Fail |

[7]"Pass" means that the coated substrate released, i.e, demolded, from the second mold by gravity (was untouched) when the mold was opened. "Fail" means that coated substrate did not release from the second mold as required for a "Pass".

Example 3

A coating composition was prepared using the ingredients and amounts listed in Table 3. Component I was prepared in the manner described above in Example 1.

TABLE 3

| | Example 3 | |
|---|---|---|
| Ingredient | Percent by Weight | Percent by Volume |
| Component 1 | | |
| Desmophen ® XP 2488[1] | 20.98 | 21.35 |
| Desmophen ® C 1100[2] | 20.98 | 21.68 |
| Dabco ® T-12[3] | 0.47 | 0.55 |
| BYK ®-377[4] | 0.28 | 0.33 |
| FC983[5] | 0.19 | 0.22 |
| Component 2 | | |
| Desmodur ® N-3600[6] | 57.11 | 55.97 |
| Calculated Formulation Data | | |
| Weight % Solids | | 100% |
| Volume % Solids | | 100% |
| NCO:OH | | 1.3:1 |
| Mix Ratio (volume) | | 0.79:1 |
| VOC | | 0 |

Example 4

An in-mold coated plastic substrate having a projected area of 195.5 cm$^2$ was produced on an injection molding machine in an injection mold having two cavities (a first mold cavity for molding a plastic substrate and a second mold cavity for in-mold coating the molded plastic substrate, which was linked to an RIM installation). The molded plastic substrate was in the form of a rectangular plaque, the wall thickness of the substrate molding was about 3 millimeters and the coating dry film thickness was 0.1 to 1 millimeter.

The molded plastic substrate was produced in the first step. For this, granules of a PC+ABS blend (Bayblend® T85 SG from Bayer MaterialScience AG) were melted in an injection molding cylinder. After the melting operation, the melted thermoplastic was injected into the first mold cavity of the closed mold at a mold set point temperature of 165-200° F. (74-93° C.) and an external clamp pressure of 200 ton/in$^2$ (315 kg/mm$^2$). After a holding and cooling time of about 45 seconds had elapsed, the mold was opened. During this, the substrate produced was held on the ejector side of the injection mold and moved complete with the mold core, into the second mold cavity by a slide. The second mold cavity was coated beforehand with a coating of electroless nickel and polytetrafluoroethylene (Poly-Ond®, from Poly-Plating, Inc.). Once the substrate was in position in the second mold cavity, the injection mold was closed again, an external mold clamp pressure of 100 tons/in$^2$ (157 kg/mm$^2$) was applied and the solvent-free coating composition of Example 3 was injected into the second mold cavity which had a mold temperature of 220° F. (104° C.). Component I and Component II of the coating composition were fed from the RIM installation into an impingement mixing head and mixed there before the injection at a flow rate of 17 grams/second, a line pressure of 2500 to 2800 psi (176 to 197 kg/cm$^2$) and a temperature of 120-125° F. (49-52° C.). Component I was fed from the RIM installation through an orifice having a diameter of 0.00032 inch (8.1 μm) and Component II was fed from the RIM installation through an orifice having a diameter of 0.00028 inch (7.1 μm). After a reaction time in the second mold cavity of 75 seconds had elapsed, the mold was opened and the coated molded substrate released, i.e., demolded, from the second mold cavity by force of gravity alone when the mold was opened.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A process for in-mold coating comprising:
    (a) molding a plastic substrate in a first mold cavity of a mold comprising at least two cavities to form a molded plastic substrate;
    (b) introducing the molded plastic substrate into a second mold cavity of the mold;
    (c) introducing a coating composition into the second mold cavity containing the molded plastic substrate in order to coat the substrate, the coating composition comprising:
        (i) a polymer comprising isocyanate-reactive groups; and
        (ii) a polyisocyanate;
    (d) curing the composition in the second mold cavity at cure conditions of a mold temperature of 62-105° C. and an external mold pressure of at least 100 kg/mm² for a period of at least 60 seconds; and
    (e) opening the mold cavity, wherein the coated molded substrate release from the second mold cavity by gravity alone or with suction alone.

2. The process of claim 1, wherein the substrate comprises a polycarbonate/acrylonitrile butadiene styrene (PC/ABS) blend.

3. The process of claim 1, wherein the molding of the substrate in the first mold cavity is conducted in the presence of a silicone comprising isocyanate-reactive functional groups.

4. The process of claim 1, wherein the coating composition is a 100% solids composition.

5. The process of claim 1, wherein the polymer comprising isocyanate-reactive groups comprises: (i) an aromatic branched polyester polyol; and (ii) an aliphatic polycarbonate polyol.

6. The process of claim 5, wherein the aromatic branched polyester polyol has a $M_n$ of 400 to 1000 gram/mole, a hydroxyl functionality of 1.9 to 2.5, a viscosity at 23° C. of 3000 to 5000 mPa·s, when measured according to DIN EN ISO 3219/A3 determined using a rotational viscometer—Visco Tester® 550, Thermo Haake GmbH, a hydroxyl content of 15.4-16.6% measured according to DIN 53 240/2, and a hydroxyl number of 100 to 200 mg KOH/gram.

7. The process of claim 5, wherein the weight ratio of (i) and (ii) in the coating composition is in the range of 1:4 to 4:1.

8. The process of claim 1, wherein the polyisocyanate comprises an isocyanurate of hexamethylene diisocyanate.

9. The process of claim 8, wherein the polyisocyanate has a viscosity at 23° C. and at 100% solids of 800 to 1400 mPa·s, when measured according to DIN EN ISO 3219/A3 determined using a rotational viscometer—Visco Tester® 550, Thermo Haake GmbH; an isocyanate group content of 22.5-23.5% according to DIN EN ISO 11909; an NCO calculated functionality of 2.8 to 3.2; and a content of monomeric diisocyanate of less than 1 wt. %.

10. The process of claim 1, wherein the polymer comprising isocyanate-reactive groups and the polyisocyanate are combined in relative amounts such that the coating composition has a ratio of isocyanate groups to isocyanate-reactive groups of 1:1 to 1.8:1.

11. The process of claim 10, wherein the ratio is at least 1.3:1.

12. The process of claim 1, wherein the composition further comprises a polyether-modified silicone present in the composition in an amount of 0.1 to 1.0 percent by weight, based on the total weight of the coating composition.

13. The process of claim 1, wherein the composition further comprises a silicone that is present in the composition in an amount sufficient to provide a cured coating with a surface tension of no more than 30 dynes/cm.

14. The process of claim 1, wherein an external release agent is present on a surface of the second mold cavity, wherein the external release agent comprises a coating comprising electroless nickel and polytetrafluoroethylene.

15. The process of claim 1, wherein the coating is cured:
    (a) at a mold temperature of 75 to 105° C.,
    (b) an external mold pressure of at least 110 (10787 bar); and
    (c) for a period of at least at least 70 seconds.

* * * * *